(12) United States Patent
Ma et al.

(10) Patent No.: US 12,401,262 B2
(45) Date of Patent: Aug. 26, 2025

(54) POWER ADAPTER WITH LIMITED POWER SOURCE FUNCTION AND CONTROL METHOD THEREOF

(71) Applicant: Delta Electronics (Shanghai) Co., Ltd., Shanghai (CN)

(72) Inventors: Kehua Ma, Shanghai (CN); Daofei Xu, Shanghai (CN); Haitao Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 244 days.

(21) Appl. No.: 18/243,303

(22) Filed: Sep. 7, 2023

(65) Prior Publication Data
US 2024/0146172 A1    May 2, 2024

(30) Foreign Application Priority Data

Nov. 2, 2022    (CN) .......................... 202211363517.8

(51) Int. Cl.
*H02M 5/12*    (2006.01)
*H02M 1/00*    (2006.01)

(52) U.S. Cl.
CPC .......... *H02M 1/0012* (2021.05); *H02M 5/12* (2013.01)

(58) Field of Classification Search
CPC .............................. H02M 1/0012; H02M 5/12
See application file for complete search history.

(56) References Cited

U.S. PATENT DOCUMENTS

2014/0078789 A1* 3/2014 Li ..................... H02M 3/33507
                                                    363/21.16
2024/0421718 A1* 12/2024 Xiao ................. H02M 3/33592

FOREIGN PATENT DOCUMENTS

| CN | 106329933 A | 1/2017 |
| CN | 109742956 A | 5/2019 |
| CN | 214544120 U | 10/2021 |
| CN | 114498566 A | 5/2022 |

* cited by examiner

*Primary Examiner* — Adolf D Berhane
(74) *Attorney, Agent, or Firm* — KIRTON McCONKIE; Evan R. Witt

(57) ABSTRACT

A power adapter includes a transformer, an output terminal, a secondary side circuit and a secondary side controller including an operational amplifier. The secondary side circuit includes a first switch, a second switch and a sampling resistor. The first switch is connected with a secondary winding of the transformer and the second switch. The second switch is connected with the output terminal. The sampling resistor is connected between the secondary winding and the output terminal for acquiring a sampling voltage. The operational amplifier generates a voltage difference value according to the result of comparing a reference voltage value with a feedback voltage value. When the sampling voltage is lower than a first voltage level and the voltage difference value is greater than a second voltage level, the second switch is turned off under control of the secondary side controller.

20 Claims, 3 Drawing Sheets

POWER ADAPTER WITH LIMITED POWER SOURCE FUNCTION AND CONTROL METHOD THEREOF

CROSS-REFERENCE TO RELATED APPLICATION

This application claims priority to China Patent Application No. 202211363517.8, filed on Nov. 2, 2022, the entire contents of which are incorporated herein by reference for all purposes.

FIELD OF THE INVENTION

The present disclosure relates to a power adapter, and more particularly to a power adapter with a limited power source function and a control method of the power adapter.

BACKGROUND OF THE INVENTION

As known, the safety standard IEC 60950 is related to the specifications about the limited power source (LPS) functions of power supply products such as power adapters. In accordance with the safety standard, the power supply product needs to have a flame-retardant case. However, if the power adapter meets the LPS requirements, the flame-retardant case is not necessary. This requirement is also applied to the PD power adapter.

In order to meet the LPS requirements, the output of the power adapter must not exceed 8 A/100 VA. If no current-limiting protection device (e.g., a system with an output voltage lower than 30V) is used, the single fault test needs to comply with a strict requirement. For example, if the output voltage is 20V, the output current cannot exceed 5 A, and the total output power cannot exceed 100 VA.

The power levels of the conventional PD power adapters include 45 W and 65 W. Consequently, it is easy to limit the output power to the power level under 100 W. However, these power levels cannot meet the requirements of today's electronic products. Consequently, the TYPE-C power adapters with the output power close to 100 W (e.g., 90~96 W power adapters) have been introduced into the market. In terms of fire protection, the Type-C connector only allows a maximum output current of 5 A. Consequently, these power adapters need to meet the LPS requirements.

The conventional power adapters complying with the USB PD specifications (e.g., 65 W power adapters) can meet the LPS requirements when a single fault occurs. For example, when the secondary side sampling resistor of the power adapter is short-circuited, the LPS function can be realized through the over-current protection function of the control chip in the primary side circuit. However, when the power adapter complying with the USB PD specifications and generating the output power close to 100 W is used, some problems occur. For example, if the secondary side sampling resistor is short-circuited, the LPS function cannot be realized through the over-current protection function of the primary side circuit because the over-current protection point of the control chip of the primary side circuit is usually greater than 100 W.

Therefore, there is a need of providing a power adapter with a limited power source function and a control method of the power adapter in order to overcome the drawbacks of the conventional technologies.

SUMMARY OF THE INVENTION

The present disclosure provides a power adapter with a limited power source function and a control method of the power adapter. A voltage difference value related to the output power of the power adapter is acquired. A secondary side controller of the power adapter determines whether the LPS function is triggered according to the voltage difference value. Consequently, the circuitry topology is simplified, the output power of the power converter is increased, and the LPS function is effectively achieved.

In accordance with an aspect of present disclosure, a power adapter with a limited power source function is provided. The power adapter includes a transformer, an output terminal, a secondary side circuit and a secondary side controller. The transformer includes a primary winding and a secondary winding. The secondary side circuit is electrically connected between a secondary winding of the transformer and the output terminal. The secondary side circuit includes a first switch, a second switch and a sampling resistor. A first terminal of the first switch is electrically connected with a first terminal of the secondary winding. A second terminal of the first switch is electrically connected with a first terminal of the second switch. A second terminal of the second switch is electrically connected with a first terminal of the output terminal. The sampling resistor is electrically connected between a second terminal of the secondary winding and a second terminal of the output terminal. The secondary side controller is configured to control on/off states of the second switch and includes an operational amplifier. A non-inverting input terminal of the operational amplifier receives a reference voltage value, an inverting input terminal of the operational amplifier receives a feedback voltage value, and an output terminal of the operational amplifier generates a voltage difference value to the secondary side circuit. The secondary side controller acquires a sampling voltage according to the sampling resistor. When the sampling voltage is lower than or equal to a first voltage level and the voltage difference value is greater than or equal to a second voltage level, the second switch is turned off under control of the secondary side controller.

In an embodiment, when the sampling voltage is lower than or equal to the first voltage level and a time duration that the voltage difference value is greater than or equal to the second voltage level exceeds a predetermined time value, the second switch is turned off under control of the secondary side controller.

In an embodiment, the predetermined time value is at least 50 ms.

In an embodiment, the power adapter further comprises a compensation circuit, wherein the compensation circuit is electrically connected between the inverting input terminal of the operational amplifier and the output terminal of the operational amplifier, and the compensation circuit comprises a first capacitor, a second capacitor and a compensation resistor, wherein the second capacitor and the compensation resistor are connected with each other in series, and the first capacitor is connected with a serially-connected structure of the second capacitor and the compensation resistor in parallel.

In an embodiment, the power adapter further comprises an A/D converter, and the voltage difference value is converted into a digital value by the A/D converter.

In an embodiment, a lookup table is stored in the secondary side controller, which records the voltage difference values corresponding to the power adapter when limiting the output voltage at different voltage levels.

In an embodiment, when the sampling voltage is lower than or equal to the first voltage level, the second voltage level is set to the voltage difference value corresponding to the current voltage level of the output voltage.

In accordance with another aspect of present disclosure, a control method for a power adapter. The control method includes the following steps. In a step (S1), the power adapter is provided. The power adapter includes a transformer, a secondary side circuit, a secondary side controller and an output terminal, wherein the secondary side circuit is electrically connected between a secondary winding of the transformer and the output terminal. The secondary side circuit includes a first switch, a second switch and a sampling resistor. A first terminal of the first switch is electrically connected with a first terminal of the secondary winding. A second terminal of the first switch is electrically connected with a first terminal of the second switch. A second terminal of the second switch is electrically connected with a first terminal of the output terminal. The sampling resistor is electrically connected between a second terminal of the secondary winding and a second terminal of the output terminal. Moreover, an on/off states of the second switch are controlled by the secondary side controller. In a step (S2), the second switch is turned on under control of the secondary side controller turning on. In a step (S3), the secondary side controller acquires a sampling voltage according to the sampling resistor. In a step (S4), the secondary side controller determines whether the sampling voltage is lower than or equal to a first voltage level. When a determining condition of the step (S4) is satisfied, a step (S5) is performed. In the (S5), the secondary side controller receives a voltage difference value. The voltage difference value is related to an output power of the power adapter. In a step (S6), the secondary side controller determines whether the voltage difference value is greater than or equal to a second voltage level. When a determining condition of the step (S6) is satisfied, a step (S7) is performed. In the step (S7), the secondary side controller turning off the second switch.

In an embodiment, the voltage difference value is obtained according to a feedback voltage value and a reference voltage value.

In an embodiment, after an output voltage of the power adapter is subjected to voltage division by a voltage divider, the feedback voltage value is generated.

In an embodiment, the reference voltage value is 1.25V or 2.5V.

In an embodiment, the voltage difference value is obtained by an operational amplifier by comparing the feedback voltage value with the reference voltage value.

In an embodiment, a compensation circuit is electrically connected between an inverting input terminal of the operational amplifier and an output terminal of the operational amplifier, and the compensation circuit comprises a first capacitor, a second capacitor and a compensation resistor, wherein the second capacitor and the compensation resistor are connected with each other in series, and the first capacitor is connected with a serially-connected structure of the second capacitor and the compensation resistor in parallel.

In an embodiment, the first voltage level is 0V, and the voltage difference value corresponding to an output power of 80 W is set as the second voltage level.

In an embodiment, the step (S7) comprises sub-steps of: (S70) the secondary side controller determining whether the sampling voltage is lower than or equal to the first voltage level and a time duration that the voltage difference value is greater than or equal to the second voltage level exceeds a predetermined time value, wherein when a determining condition of the sub-step (S70) is satisfied, a sub-step (S71) is performed; and (S71) the secondary side controller turning off the second switch.

In an embodiment, the predetermined time value is at least 50 ms.

In an embodiment, when the determining condition of the sub-step (S70) is not satisfied, the step (S4) is repeatedly done.

In an embodiment, a lookup table is stored in the secondary side controller, which records the voltage difference values corresponding to the power adapter when limiting the output voltage at different voltage levels.

In an embodiment, when the sampling voltage is lower than or equal to the first voltage level, the second voltage level is set to the voltage difference value corresponding to the current voltage level of the output voltage.

In an embodiment, when the determining condition of the step (S4) is not satisfied, the step (S3) is repeatedly done, wherein if the determining condition of the step (S6) is not satisfied, the step (S5) is repeatedly done.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
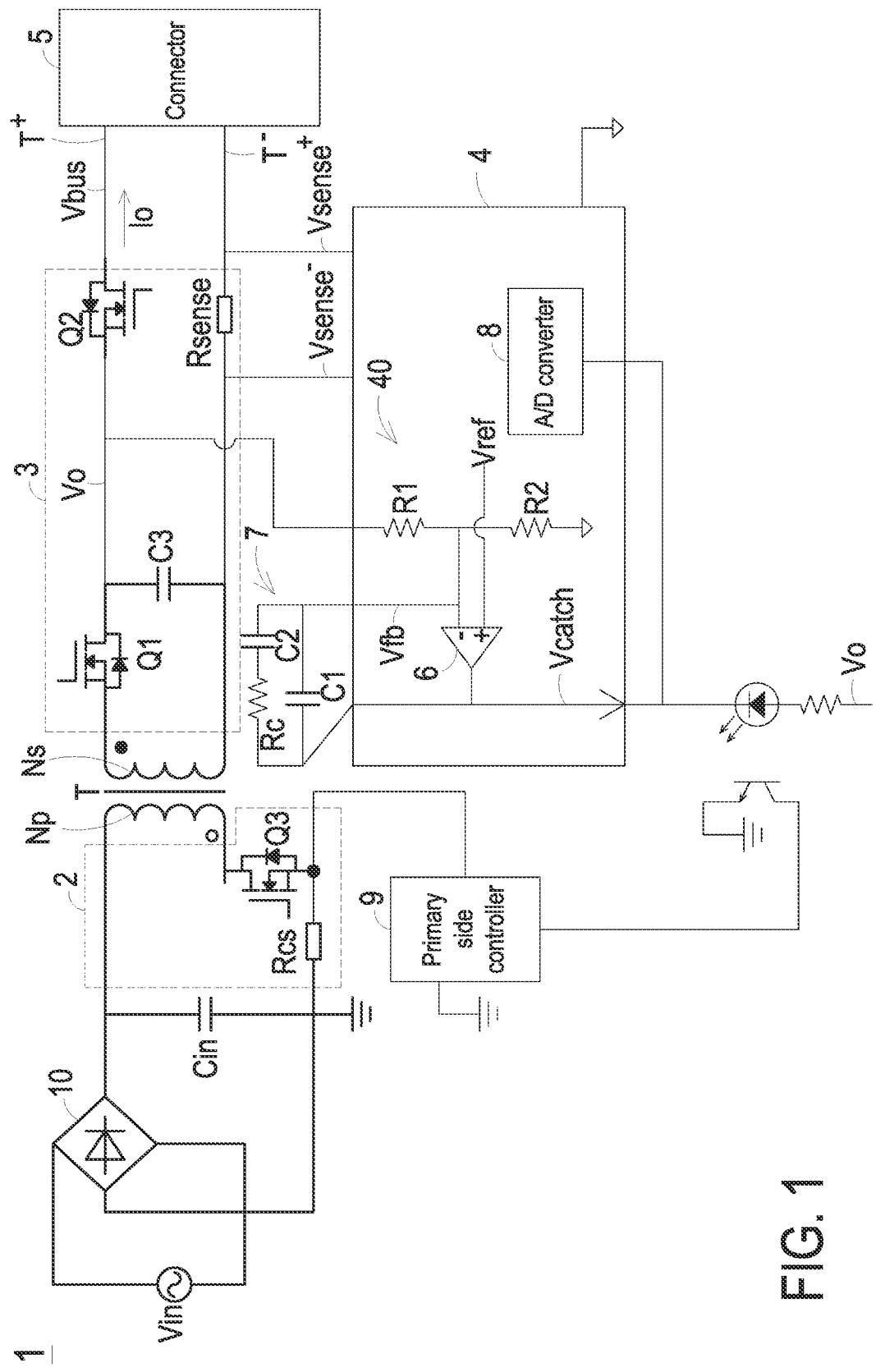
FIG. 1 is a schematic circuit diagram illustrating the circuitry topology of a power adapter with a limited power source function according to an embodiment of the present disclosure.
Figure 2:
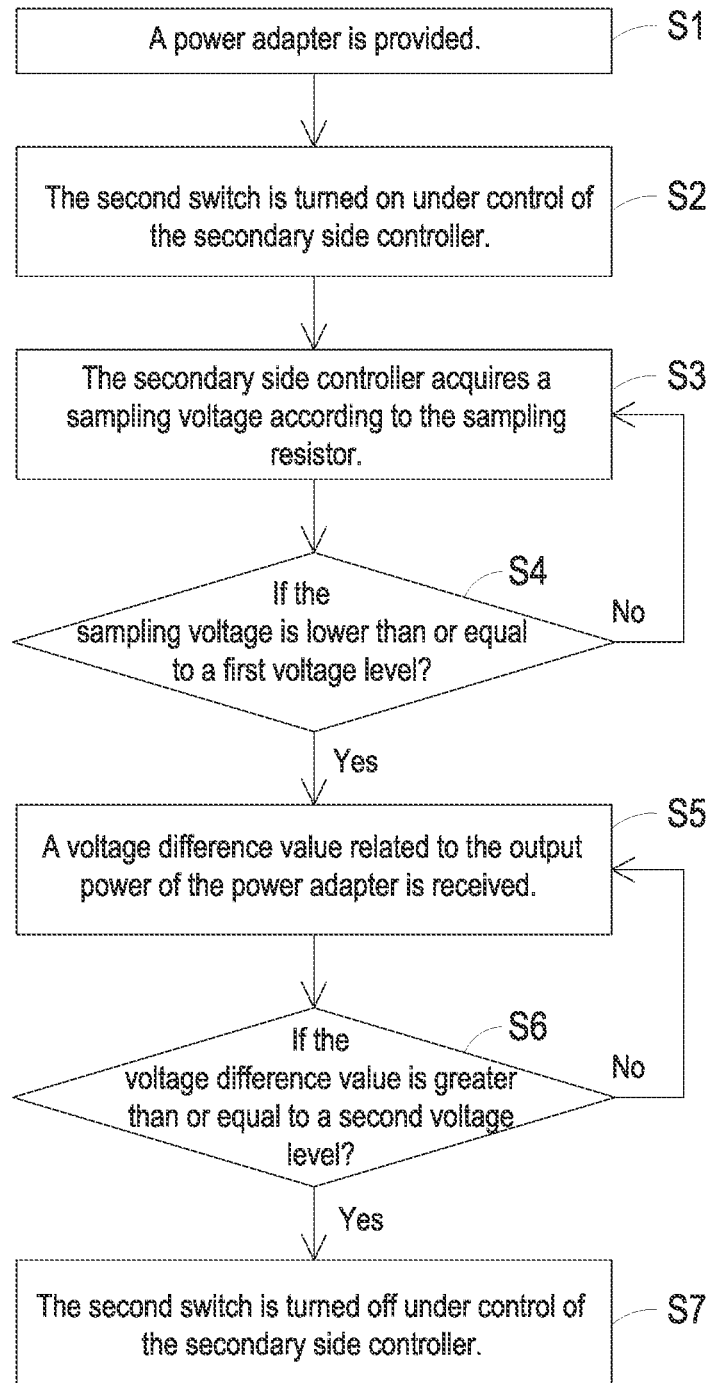
FIG. 2 is a flowchart of a control method for the power adapter as shown in FIG. 1.

Please refer to FIGS. 1 and 2. FIG. 1 is a schematic circuit diagram illustrating the circuitry topology of a power adapter with a limited power source function according to an embodiment of the present disclosure. FIG. 2 is a flowchart of a control method for the power adapter as shown in FIG. 1. As shown in FIGS. 1 and 2, the power adapter 1 can meet the limited power source (LPS) requirements. The power adapter 1 includes a transformer T, a secondary side circuit 3, a secondary side controller 4 and an output terminal. The output terminal includes a positive output terminal T+ and a negative output terminal T−.

The transformer T includes a primary winding Np and a secondary winding Ns, which are electromagnetically coupled with each other. The secondary winding Ns has two terminals. The secondary side circuit 3 is electrically connected between the secondary winding Ns and the output terminal. By the secondary side circuit 3, the electric power from the secondary winding Ns is converted into an output voltage Vbus. The output voltage Vbus is outputted from the output terminal of the power adapter 1. In an embodiment, the secondary side circuit 3 includes a first switch Q1, a second switch Q2 and a sampling resistor Rsense. The first terminal of the first switch Q1 is electrically connected with the first terminal of the secondary winding Ns. The second terminal of the first switch Q1 is electrically connected with the first terminal of the second switch Q2. The second terminal of the second switch Q2 is electrically connected with the positive output terminal T+ of the output terminal. The first terminal of the sampling resistor Rsense is electrically connected with the second terminal of the secondary winding Ns. The second terminal of the sampling resistor Rsense is electrically connected with the negative output terminal T− of the output terminal. That is, the sampling resistor Rsense is electrically connected between the second terminal of the secondary winding Ns and the negative output terminal T− of the output terminal.

The secondary side controller 4 is electrically connected with the control terminal of the second switch Q2. For succinctness, the connecting relationship is not shown in FIG. 1. The on/off states of the second switch Q2 are controlled by the secondary side controller 4. The secondary side controller 4 is also electrically connected with the first terminal and the second terminal of the sampling resistor Rsense. According to the voltage difference between the voltage Vsenese− at the first terminal of the sampling resistor Rsense and the voltage Vsenese+ at the second terminal of the sampling resistor Rsense, the secondary side controller 4 acquires a sampling voltage.

In an embodiment, the secondary side controller 4 includes an operational amplifier 6 and an AD converter 8, and the power adapter 1 further includes the compensation circuit 7.

The secondary side controller 4 further receives a feedback voltage value Vfb. In addition, a reference voltage value Vref is previously stored in the secondary side controller 4. By comparing the feedback voltage value Vfb with the reference voltage value Vref, the operational amplifier 6 generates a voltage difference value Vcatch. In addition, after the voltage difference value Vcatch is processed by the compensation circuit 7, the feedback voltage value Vfb is adjusted. The voltage difference value Vcatch is related to the output power of the power adapter. In addition, the voltage difference value Vcatch is received by the AD converter 8. Moreover, a first voltage level and a second voltage level are previously stored in the secondary side controller 4. According to the result of comparing the sampling voltage with the first voltage level and the result of comparing the voltage difference value Vcatch with the second voltage level, the secondary side controller 4 determines whether the second switch Q2 needs to be turned off. Once the second switch Q2 is turned off, the LPS function can be achieved. For example, if the sampling voltage is lower than or equal to the first voltage level and the voltage difference value Vcatch is greater than or equal to the second voltage level, the second switch Q2 is turned off under control of the secondary side controller 4.

Preferably but not exclusively, the power adapter 1 is a flyback converter, an asymmetric half-bridge converter or an LLC-buck converter. In an embodiment, the power adapter 1 further includes a connector 5. The connector 5 is electrically connected with the output terminal of the power adapter 1 and a load (not shown). For example, the connector 5 is a Type C connector, and the power adapter 1 is a Type-C Power Delivery (PD) power adapter. Moreover, the first switch Q1 is a synchronous rectifier switch.

In some embodiments, when the sampling voltage is lower than or equal to the first voltage level and the time duration that the voltage difference value Vcatch is greater than or equal to the second voltage level exceeds a predetermined time value, the second switch Q2 is turned off under control of the secondary side controller 4. Preferably but not exclusively, the first voltage level is 0V.

The present disclosure further provides a control method for the power converter 1. In an embodiment, the control method includes the following steps.

Firstly, in a step S1, the power adapter 1 with the circuitry topology of FIG. 1 is provided.

In a step S2, the second switch Q2 is turned on under control of the secondary side controller 4.

In a step S3, the secondary side controller 4 acquires a sampling voltage according to the sampling resistor Rsense.

In a step S4, the secondary side controller 4 determines whether the sampling voltage is lower than or equal to the first voltage level.

If the determining condition of the step S4 is satisfied, a step S5 is performed. Whereas, if the determining condition of the step S4 is not satisfied, the step S3 is repeatedly done. If the sampling voltage is lower than or equal to the first voltage level, it means that the sampling resistor Rsense is short-circuited. In the conventional power adapter with the power level close to 100 W, the output current is usually unable to be accurately controlled to be lower than 5 A, and thus the LPS function is lost. In accordance with the technologies of the present disclosure, if the secondary side controller 4 determines that the sampling voltage is lower than or equal to the first voltage level, it means that the power adapter 1 is in a single fault condition.

In a step S5, the secondary side controller 4 receives the voltage difference value Vcatch. The voltage difference value Vcatch is related to the output power of the power adapter 1. In this step, the voltage difference value Vcatch is increased with the increasing output power. Consequently, the output condition of the power adapter 1 can be determined according to the voltage difference value Vcatch.

In a step S6, the secondary side controller 4 determines whether the voltage difference value Vcatch is greater than or equal to the second voltage level. According to the settings, the second voltage level is the voltage difference value Vcatch when the output power is 80 W. If the determining condition of the step S6 is satisfied, a step S7 is performed. Whereas, if the determining condition of the step S6 is not satisfied, the step S5 is repeatedly done.

In a step S7, the second switch Q2 is turned off under control of the secondary side controller 4. Under this circumstance, the power adapter 1 is disabled. Since the output voltage Vbus is not transmitted to the output terminal of the power adapter 1. The LPS function is achieved.

As mentioned above, when the sampling resistor Rsense is short-circuited, the power adapter 1 is in the single fault condition. Meanwhile, the secondary side controller 4 determines whether the LPS function needs to be executed according to the result of comparing the voltage difference value Vcatch with the second voltage level. When the LPS function needs to be executed, the second switch Q2 is turned off under control of the secondary side controller 4. Consequently, even if the sampling resistor Rsense is short-circuited, the LPS function of the power adapter 1 can be effectively executed.

However, the above method still has some drawbacks. In some situations, the LPS function may be erroneously triggered. For example, if an overpower condition occurs in a short time, the peak power of the power adapter 1 appears, and the LPS function may be erroneously triggered. Alternatively, when the power adapter 1 performs a dynamic test, for example from 0 A to 1 A, the output voltage Vbus will drop suddenly due to the sudden load. In case that the voltage difference value Vcatch exceeds the second voltage level in a short time, the LPS function is erroneously triggered. For avoiding the problem of erroneously triggering the LPS function, the above method needs to be further modified.

Figure 3:
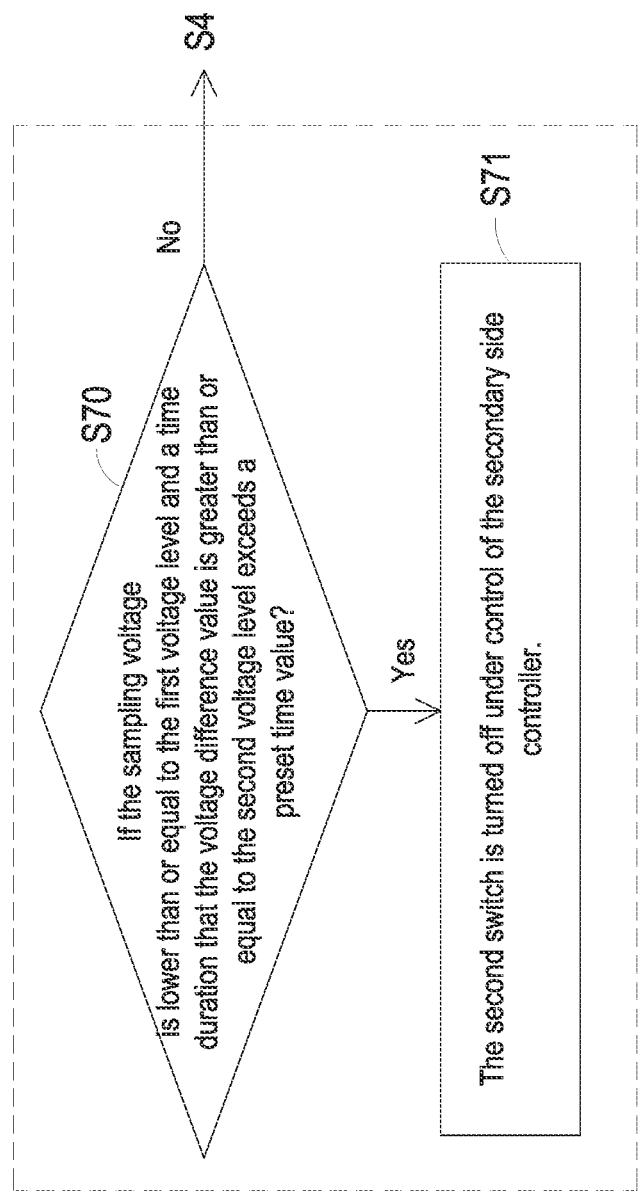
FIG. 3 is a flowchart illustrating the sub-steps of the step S7 of the control method according to the embodiment of the present disclosure.

FIG. 3 is a flowchart illustrating the sub-steps of the step S7 of the control method according to the embodiment of the present disclosure. The step S7 includes two sub-steps S70 and S71. If the determining result of the step S6 indicates that the voltage difference value Vcatch is greater than or equal to the second voltage level, the sub-step S70 is performed.

In the sub-step S70, the secondary side controller 4 determines whether the sampling voltage is lower than or equal to the first voltage level and the time duration that the voltage difference value Vcatch is greater than or equal to the second voltage level exceeds the predetermined time value. If the determining condition of the sub-step S70 is satisfied, the sub-step S71 is performed. Whereas, if the determining condition of the sub-step S70 is not satisfied, the step S4 is repeatedly done.

In the step S71, the second switch Q2 is turned off under control of the secondary side controller 4.

In an embodiment, the predetermined time value is at least 50 ms. Due to the predetermined time value, the problem of erroneously triggering the LPS function can be solved.

Please refer to FIG. 1 again. In an embodiment, the power adapter 1 further includes the operational amplifier 6. The non-inverting input terminal of the operational amplifier 6 receives the reference voltage value Vref. The inverting input terminal of the operational amplifier 6 receives the feedback voltage value Vfb. The output terminal of the operational amplifier 6 outputs the voltage difference value Vcatch. Preferably but not exclusively, the reference voltage value Vref is 1.25V or 2.5V.

In an embodiment, the compensation circuit 7 is electrically connected between the inverting input terminal of the operational amplifier 6 and the output terminal of the operational amplifier 6. The compensation circuit 7 includes a first capacitor C1, a second capacitor C2 and a compensation resistor Rc. The second capacitor C2 and the compensation resistor Rc are connected with each other in series. The first capacitor C1 is connected with the serially-connected structure of the second capacitor C2 and the compensation resistor Rc in parallel. Due to the arrangement of the compensation circuit 7, the change of the voltage difference value Vcatch is slow when the power adapter 1 is subjected to the dynamic test. Consequently, when the power adapter 1 is subjected to the dynamic test, the voltage difference value Vcatch will not have the tendency to be greater than or equal to the second voltage level. In other words, the use of the compensation circuit 7 increases the anti-interference ability of the voltage difference value Vcatch.

In an embodiment, the secondary side controller 4 further includes a voltage divider 40. The voltage divider 40 is electrically connected with the secondary side circuit 3. The voltage divider 40 is electrically connected with a first node between the second terminal of the first switch Q1 and the first terminal of the second switch Q2 to receive a terminal voltage Vo from the first node. In addition, the voltage divider 40 is electrically connected with the inverting input terminal of the operational amplifier 6. The voltage divider 40 includes a first resistor R1 and a second resistor R2. The first resistor R1 is electrically connected with the first node between the second terminal of the first switch Q1 and the first terminal of the second switch Q2 to receive the terminal voltage Vo from the first node. The second terminal of the first resistor R1 is electrically connected with the first terminal of the second resistor R2 and the inverting input terminal of the operational amplifier 6. The second terminal of the second resistor R2 is connected with the ground terminal. By the voltage divider 40, the terminal voltage Vo (i.e., the output voltage Vbus) is subjected to voltage division. Consequently, the feedback voltage value Vfb is generated. The feedback voltage value Vfb is provided to the inverting input terminal of the operational amplifier 6.

By the A/D (analog-to-digital) converter 8, the voltage difference value Vcatch is converted into a digital value. In the embodiment of FIG. 1, the A/D converter 8 is included in the secondary side controller 4. Alternatively, the A/D converter 8 is located outside the secondary side controller 4.

The following Table 1 is a lookup table about the relationship between different levels of the output power and the corresponding voltage difference values Vcatch when the output voltage is 20V. As shown in Table 1, the voltage difference value Vcatch is related to the output power. In case that the output voltage from the power adapter 1 has a plurality of voltage levels, a second voltage level corresponding to each voltage level of the output voltage can be defined.

TABLE 1

Relationship between the voltage difference value Vcatch and the output power for 20 V output voltage

| Output power (W) | Terminal voltage Vo (V) | Voltage difference value Vcatch (V) | Digital value of Vcatch |
|---|---|---|---|
| 0 | 19.9 | 16.17 | 0xA2 |
| 80 | 19.93 | 16.71 | 0xA7 |
| 100 | 19.95 | 17 | 0xAA |

Moreover, Table 2 is a lookup table about the relationship between different voltage levels of the output voltage and the corresponding voltage difference values Vcatch in the LPS state. This lookup table is stored in the secondary side controller 4.

TABLE 2

Lookup table in the secondary side controller

| Voltage level(V) | Output voltage(V) | Current (A) | Limited power | Vcatch (V) |
|---|---|---|---|---|
| 15 | 15 | 5.33 | 80 W | 11.2 |
| 20 | 20 | 4 | 80 W | 16.7 |
| 28 | 28 | 2.86 | 80 W | 23.5 |

In the step S6, the second voltage level is determined by the secondary side controller 4 according to the relationship between the voltage difference value Vcatch and the output power in the lookup table (e.g., Table 1) when the LPS function of the power adapter needs to be triggered. Moreover, if the sampling voltage is lower than or equal to the first voltage level, the second voltage level is determined by the secondary side controller 4 according to the relationship between the voltage difference value and the voltage level of the output voltage in the lookup table (e.g., Table 2). For example, if the current voltage level is 20V, the second voltage level is set as 16.7V. Moreover, if the voltage level is 28V, the second voltage level is set as 23.5V.

For example, the voltage difference value Vcatch corresponding to the digital value 0XA7 is defined as the second voltage level. The output power corresponding to this digital value is 80 W. That is, when the output power of the power adapter 1 is 80 W, the LPS function needs to be triggered. If the sampling voltage is lower than or equal to the first voltage level and the digital value of the voltage difference value Vcatch is greater than 0XA7, the LPS function of the power adapter 1 will be triggered.

Furthermore, in case that the power adapter 1 is abnormal, for example in the overcurrent condition, the overvoltage condition, over-temperature condition or communication failure condition, the second switch Q2 is turned off under control of the secondary side controller 4. Under this circumstance, the power adapter 1 is disabled, and the output voltage Vbus is not outputted. Consequently, the function of protecting the power adapter 1 and the load can be achieved.

In an embodiment, the secondary side circuit 3 further includes a third capacitor C3. The first terminal of the third capacitor C3 is connected with the second terminal of the first switch Q1 and the first terminal of the second switch Q2. The second terminal of the third capacitor C3 is connected with the second terminal of the secondary winding Ns.

In an embodiment, the power adapter 1 further includes a primary side circuit 2. The primary side circuit 2 is electrically connected with the primary winding Np. The primary side circuit 2 includes a third switch Q3 and a primary side sampling resistor Rcs. The first terminal of the third switch Q3 is electrically connected with the first terminal of the primary winding Np. The first terminal of the primary side sampling resistor Rcs is electrically connected with the second terminal of the third switch Q3. The second terminal of the primary side sampling resistor Rcs is connected to the ground terminal.

In an embodiment, the power adapter 1 further includes a primary side controller 9. The primary side controller 9 is electrically connected with the control terminal of the third switch Q3. For succinctness, the connecting relationship is not shown in FIG. 1. The on/off states of the third switch Q3 are controlled by the primary side controller 9. The primary side controller 9 is electrically connected with the first terminal and the second terminal of the primary side sampling resistor Rcs. The primary side controller 9 acquires a primary side sampling voltage according to the voltage difference between the first terminal and the second terminal of the primary side sampling resistor Rcs. Moreover, the primary side controller 9 further acquires a primary side sampling current flowing through the primary side sampling resistor Rcs.

In an embodiment, the power adapter 1 further includes a rectifying circuit 10 and an input capacitor Cin. The rectifying circuit 10 receives an input voltage Vin and rectifies the input voltage. The first terminal of the input capacitor Cin is electrically connected with the rectifying circuit 10 and the second terminal of the primary winding Np of the transformer T. The second terminal of the input capacitor Cin is connected to the ground terminal. The input capacitor Cin provides the filtering function.

From the above descriptions, the present disclosure provides a power adapter and a control method for the power adapter. When the sampling resistor is short-circuited, the power adapter is in the single fault condition. The voltage difference value is related to the output power of the power adapter. The secondary side controller determines whether the LPS function needs to be triggered according to the result of comparing the voltage difference value with the second voltage level. When the LPS function needs to be executed, the second switch is turned off under control of the secondary side controller. Consequently, the LPS function can be achieved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power adapter with a limited power source function, the power adapter comprising:
a transformer comprising a primary winding and a secondary winding;
an output terminal;
a secondary side circuit electrically connected between the secondary winding of the transformer and the output terminal, and comprising a first switch, a second switch and a sampling resistor, wherein a first terminal of the first switch is electrically connected with a first terminal of the secondary winding, a second terminal of the first switch is electrically connected with a first terminal of the second switch, a second terminal of the second switch is electrically connected with a first terminal of the output terminal, and the sampling resistor is electrically connected between a second terminal of the secondary winding and a second terminal of the output terminal; and
a secondary side controller configured to control on/off states of the second switch and comprising an operational amplifier, wherein a non-inverting input terminal of the operational amplifier receives a reference voltage value, an inverting input terminal of the operational amplifier receives a feedback voltage value, and an output terminal of the operational amplifier generates a voltage difference value to the secondary side circuit, wherein the secondary side controller acquires a sampling voltage according to the sampling resistor, wherein when the sampling voltage is lower than or equal to a first voltage level and the voltage difference value is greater than or equal to a second voltage level, the second switch is turned off under control of the secondary side controller.

2. The power adapter according to claim 1, wherein when the sampling voltage is lower than or equal to the first voltage level and a time duration that the voltage difference value is greater than or equal to the second voltage level exceeds a predetermined time value, the second switch is turned off under control of the secondary side controller.

3. The power adapter according to claim 2, wherein the predetermined time value is at least 50 ms.

4. The power adapter according to claim 1, wherein the power adapter further comprises a compensation circuit, wherein the compensation circuit is electrically connected between the inverting input terminal of the operational amplifier and the output terminal of the operational amplifier, and the compensation circuit comprises a first capacitor, a second capacitor and a compensation resistor, wherein the second capacitor and the compensation resistor are connected with each other in series, and the first capacitor is connected with a serially-connected structure of the second capacitor and the compensation resistor in parallel.

5. The power adapter according to claim 1, wherein the power adapter further comprises an A/D converter, and the voltage difference value is converted into a digital value by the A/D converter.

6. The power adapter according to claim 5, wherein a lookup table is stored in the secondary side controller, which records the voltage difference values corresponding to the power adapter when limiting the output voltage at different voltage levels.

7. The power adapter according to claim 6, wherein when the sampling voltage is lower than or equal to the first voltage level, the second voltage level is set to the voltage difference value corresponding to the current voltage level of the output voltage.

8. A control method for a power adapter, the control method comprising steps of:
(S1) providing the power adapter, wherein the power adapter comprises a transformer, a secondary side circuit, a secondary side controller and an output terminal, wherein the secondary side circuit is electrically connected between a secondary winding of the transformer and the output terminal, and the secondary side circuit comprises a first switch, a second switch and a sampling resistor, wherein a first terminal of the first switch is electrically connected with a first terminal of the secondary winding, a second terminal of the first switch is electrically connected with a first terminal of the second switch, a second terminal of the second switch is electrically connected with a first terminal of the output terminal, and the sampling resistor is electrically connected between a second terminal of the secondary winding and a second terminal of the output terminal, wherein on/off states of the second switch are controlled by the secondary side controller;
(S2) the secondary side controller turning on the second switch;
(S3) the secondary side controller acquiring a sampling voltage according to the sampling resistor;
(S4) the secondary side controller determining whether the sampling voltage is lower than or equal to a first voltage level, wherein when a determining condition of the step (S4) is satisfied, a step (S5) is performed;
(S5) the secondary side controller receiving a voltage difference value, wherein the voltage difference value is related to an output power of the power adapter;
(S6) the secondary side controller determining whether the voltage difference value is greater than or equal to a second voltage level, wherein when a determining condition of the step (S6) is satisfied, a step (S7) is performed; and
(S7) the secondary side controller turning off the second switch.

9. The control method according to claim 8, wherein the voltage difference value is obtained according to a feedback voltage value and a reference voltage value.

10. The method according to claim 9, wherein after an output voltage of the power adapter is subjected to voltage division by a voltage divider, the feedback voltage value is generated.

11. The control method according to claim 9, wherein the reference voltage value is 1.25V or 2.5V.

12. The control method according to claim 9, wherein the voltage difference value is obtained by an operational amplifier by comparing the feedback voltage value with the reference voltage value.

13. The control method according to claim 12, wherein a compensation circuit is electrically connected between an inverting input terminal of the operational amplifier and an output terminal of the operational amplifier, and the compensation circuit comprises a first capacitor, a second capacitor and a compensation resistor, wherein the second capacitor and the compensation resistor are connected with each other in series, and the first capacitor is connected with a serially-connected structure of the second capacitor and the compensation resistor in parallel.

14. The control method according to claim 8, wherein the first voltage level is 0V, and the voltage difference value corresponding to an output power of 80 W is set as the second voltage level.

15. The control method according to claim 8, wherein the step (S7) comprises sub-steps of:
(S70) the secondary side controller determining whether the sampling voltage is lower than or equal to the first voltage level and a time duration that the voltage difference value is greater than or equal to the second voltage level exceeds a predetermined time value, wherein when a determining condition of the sub-step (S70) is satisfied, a sub-step (S71) is performed; and
(S71) the secondary side controller turning off the second switch.

16. The control method according to claim 15, wherein the predetermined time value is at least 50 ms.

17. The control method according to claim 15, wherein when the determining condition of the sub-step (S70) is not satisfied, the step (S4) is repeatedly done.

18. The control method according to claim 8, wherein a lookup table is stored in the secondary side controller, which records the voltage difference values corresponding to the power adapter when limiting the output voltage at different voltage levels.

19. The control method according to claim 18, wherein when the sampling voltage is lower than or equal to the first voltage level, the second voltage level is set to the voltage difference value corresponding to the current voltage level of the output voltage.

20. The control method according to claim 8, wherein when the determining condition of the step (S4) is not satisfied, the step (S3) is repeatedly done, wherein if the determining condition of the step (S6) is not satisfied, the step (S5) is repeatedly done.

* * * * *